United States Patent Office 2,996,517
Patented Aug. 15, 1961

2,996,517
PRODUCTION OF DIESTERS, DIACIDS, DINITRILES AND MIXED ESTER NITRILES CONTAINING THE SPIROBI m-DIOXANE GROUP
Robert E. Leech and Julian K. Rose, South Charleston, W. Va., assignors to Union Carbide Corporation, a corporation of New York
No Drawing. Filed Dec. 30, 1957, Ser. No. 705,757
1 Claim. (Cl. 260—340.7)

This invention relates to certain novel diesters, diacids, dinitriles, cyano-esters, and cyano-acids containing a spirobi-m-dioxane group in their structures, and to the production thereof by reacting pentaerythritol with formyl esters of alkanoic aids, and corresponding formyl nitriles, and mixtures of such formyl alkanoic acid esters and nitriles, under acetalization conditions in the presence of an acidic catalyst.

The invention has special utility for the production of 3,9-bis(carbohydrocarbyloxyalkyl)-2,4,8,10-tetraoxaspiro-(5.5)hendecanes and corresponding 3,9-bis(cyanoalkyl)-2,4,8,10-tetraoxaspiro(5.5)hendecanes and corresponding mixed ester-nitriles under mild reaction conditions, and is further characterized by high product yields. The products are bifunctional esters, acids, nitriles, cyano-esters and cyano-acids in which the functional groups are separated by a hydrocarbon chain containing a spirobi-m-dioxane group.

The novel products of the invention are readily polymerizable, and form valuable linear condensation polymers. By varying the reaction conditions of the polymerization they yield infusible, insoluble resins that are obtainable as rubbery elastomers or as tough flexible films, depending upon the mode of production. The novel compounds also have been effectively employed as plasticizers for vinyl chloride polymers and particularly copolymers of vinyl chloride and vinyl acetate containing around 96% of the chloride in the polymer.

The novel compounds of the invention have structures represented by the formula

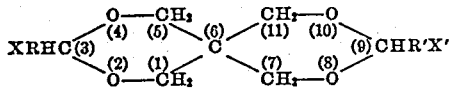

wherein R and R', respectively, designates a member of the class consisting of the divalent aliphatic straight chain and branched chain radicals of the general formula $C_nH_{2n}$ wherein $n$ is an integer from 2 to 18, the divalent cyclohexane residue, and the divalent 2,5-endomethylenecyclohexane residue; and X and X', respectively, designates a member of the class consisting of the nitrile and carboxyl radicals, and the —COOR² radicals wherein R² designates a member of the class consisting of the alkyl radicals having from 1 to 14 carbon atoms, and the monocyclic aryl hydrocarbyl radicals having 6 to 9 carbon atoms.

The importance of having a hydrogen atom attached to the carbon atom in the 3 and 9 positions of the structure is illustrated by the fact that such compounds have good thermal stability whereas when these hydrogen atoms are replaced by lower alkyl groups the products thus formed will decarboxylate at temperatures at which the products of this invention can be safely used.

In the practice of the novel process of this invention a β-, γ- or δ-formyl alkanoic ester or nitrile, or a formylhexahydrobenzoate ester, a formylendomethylenehexahydrobenzoate ester or corresponding nitrile, or mixture thereof, and pentaerythritol, are heated and condensed in a reaction medium inert to the reactants, at temperatures within the range from about 50° C. to about 150° C., in the presence of an acidic catalyst, the water of reaction being removed as formed. Reaction temperatures of from 70° C. to about 120° C. generally are preferred, and insure a rapid reaction rate while preventing or minimizing thermal abuse of the formyl compound reactant. When the reaction is completed, as evidenced by the fact that no further water is formed, the acidic catalyst is neutralized with an oxide, hydroxide, carbonate or acetate of an alkali metal or an alkaline earth metal, ammonia, or the equivalent, and the reaction mixture is filtered to remove the inorganic salts thus formed. The desired product then is recovered from the filtrate by stripping the latter of the diluent and any unreacted formyl compound under high vacuum, the desired product being obtained in near quantitative yield, as a residue which, without further purification, commonly has a purity of 95-100%.

The formyl alkanoic ester or nitrile and the pentaerythritol can be reacted in a range of molar ratios between 2 to 1 and 5 to 1, or higher, although a molar ratio of around 2.2 to 1 is generally preferred.

Acidic acetalization catalysts are effectively used in the process, among which are sulfuric acid, hydrochloric acid, phosphoric acid, calcium chloride, and the like. The concentration of catalyst in the reaction mixture can be varied from 0.001% to 1% or more, based upon the total weight of the reactants, the preferred range being from 0.01% to about 0.1% by weight of the catalyst.

Formyl esters useful as starting materials in the process include the formyl alkanoic esters and formyl carbocyclic esters, having structures represented by the formula

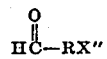

wherein R designates a divalent aliphatic radical of the formula $C_nH_{2n}$, or a divalent cycloalkane residue such as a divalent residue of cyclohexane or of endomethylenecyclohexane; and X" designates a member of the class consisting of —CN and —COOR² radicals wherein R² designates a member of the class consisting of the alkyl groups having 1 to 14 carbon atoms and the monocyclic aryl hydrocarbyl groups having 6 to 9 carbon atoms; and $n$ is an integer from 2 to 18.

Among formyl esters and nitriles useful in the process are the following: The methyl, ethyl, butyl, 2-ethylhexyl, decyl, tetradecyl, phenyl, tolyl and xylyl esters of the following acids: β-formylpropionic acid, β-formylisobutyric acid, γ-formylbutyric acid, delta-formylvaleric acid, γ-formyl-γ-methylvaleric acid, 3-formylhexanoic acid, 4-formylhexanoic acid, 5-formylhexanoic acid, 2,2,4-trimethyl-3-formylpentanoic acid, 2,2,4-trimethyl-4-formylpentanoic acid, 3-formylbutyric acid, 3-formylpentanoic acid, 4-formylpentanoic acid, 2,7,7-trimethyl-4-formyloctanoic acid, 2-butyl-5-formyl octanoic acid, 8-formyloctanoic acid, 6-ethyl-11-formyltetradecanoic acid, 9-formylstearic acid, 10-formylstearic acid, 13-formyldocosanoic acid, 14-formyldocosanoic acid, 4-formylhexahydrobenzoic acid, 3-formylhexahydrobenzoic acid, the 3- (or 4-)formylendomethylenehexahydrobenzoic acid, and mixtures thereof; and the corresponding nitriles, such as β-formylpropionitrile, γ-formylbutyronitrile and 1-cyano-4-formylcyclohexane.

Formyl alkanoic esters and formyl nitriles such as are obtained in the hydroformylation of olefinically unsaturate esters and nitriles sometimes are difficult to obtain in high purity. It has been found, as illustrated in Example 2, that a broad-range fraction, stripped from the crude hydroformylation product and containing other esters, acids, lactones, nitriles and hydrocarbon impurities, but free from other carbonyl-containing compounds, can readily be reacted with pentaerythritol to yield high-purity products of the invention in high yield, since the impurities in the hydroformylation products are volatile and are removed during vacuum stripping of the diester product.

The nature of the chemical reaction involved is illustrated by the following equation, involving the reaction of pentaerythritol with a formylalkanoic ester:

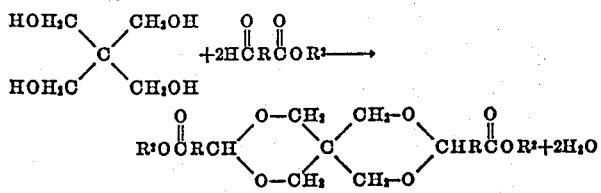

The formyl carboxylic esters used as starting materials can be made in any well known manner, as for example those disclosed on pages 401–2 of "Richter's Organic Chemistry," vol. 1 (second edition) or those disclosed in Berichte 37, p. 1801, and in Berichte 41, p. 1706.

The formyl nitriles used as starting materials can be prepared by the method of Hartung and Adkins, J. Am. Chem. Soc. 49, 2520 (1927) wherein cyanoacetals were prepared by the reaction of potassium cyanide with a bromoacetal, for example, 1,1-diethoxy-2-bromoethane and the product subsequently subjected to mild hydrolysis to yield the formyl nitrile. An alternative process involves the mono-cyanoethylation of an aldehyde, for example the reaction of acrylonitrile with isobutyraldehyde to yield 2,2-dimethyl-4-cyanobutyraldehyde.

As already indicated the principal reaction is conducted in the presence of a diluent for the reactants which is inert to the latter. While benzene is a preferred diluent for suspension of the pentaerythritol since it acts also as an entraining agent for the ready removal of the water by-product, other aromatic and aliphatic hydrocarbons boiling in the range from 50° C. to 150° C., are useful, such as toluene, the xylenes, ethylbenzenes, cyclohexane, heptane, octane and nonane. When still higher boiling hydrocarbons are used as diluents the reaction is conducted under vacuum while refluxing to remove water to keep the reaction temperature below that at which decomposition of the formyl compound occurs.

Other useful diluents include ethers such as isopropyl ether and dioxane; and chlorinated hydrocarbons such as chloroform, carbon tetrachloride and ethylene dichloride. The diluent need not be one forming an azeotrope with water.

The novel diacids of the invention are readily prepared from the corresponding diesters of the invention by saponifying the latter with water in the presence of an alkaline reagent such as an alkali metal hydroxide, in a diluent such as methanol, at temperatures within the range from about 20° to about 100° C. The reaction mixture is neutralized with a mineral acid, such as hydrochloric acid, sulfuric acid, phosphoric acid or the equivalent. The neutralized reaction mixture then is filtered, and the insoluble diacid product is washed with water and dried.

The following examples serve to illustrate the invention:

Example 1

To a glass kettle equipped with a stirrer and decanting still-head were charged 150 grams of ethyl 4-formylbutyrate (0.94 mol), 58 grams of pentaerythritol, 300 cc. of benzene and 0.09 gram of sulfuric acid, and the mixture was heated for two hours at 80–85° C. with agitation, the water being distilled off as formed as a benzene-water azeotrope, and the benzene component thereof continuously returned to the reaction zone. When no further water was found in the distillate the reaction mixture was neutralized with sodium acetate, and the neutralized mixture filtered to remove salts. The filtrate was vacuum stripped by distillation to a kettle temperature of 175° C. under an absolute pressure of less than 1 mm. of mercury. The residue product, 3,9-bis(carbethoxypropyl)2,4,8,10-tetraoxaspiro(5.5)hendecane, was secured in 82.6% yield as a viscous light amber liquid having a saponification equivalent of 388, corresponding to the theoretical value for the desired product. Chemical analysis gave the following results in percent by weight: Calculated for $C_{19}H_{32}O_8$, C=58.8%; H=8.25%. Found: C=58.4%; H=8.3%.

In a similar run, under the same reaction conditions, a quantitative yield of the aforesaid diester based upon pentaerythritol was secured after the vacuum stripping step. This product had a saponification equivalent of 386. The calculated saponification equivalent is 388.

To a solution of 65 grams of sodium hydroxide in 500 cc. of water and 350 cc. of methanol there were added 213 grams of the last-named ester, and the saponification was conducted for sixteen hours at room temperature. Then concentrated hydrochloric acid was added in sufficient quantity to neutralize the excess sodium hydroxide and to liberate the product diacid from its sodium salt. This product was recovered by filtration of the neutralized reaction mixture and was washed with water and dried. A yield of 47.1% was secured of 3,9-bis(carboxypropyl)-2,4,8,10-tetraoxaspiro(5.5)hendecane in the form of white crystals having a melting point of 188° C., a neutralization equivalent of 328 (theory 332); and the following analysis in percent by weight: Calculated for $C_{15}H_{24}O_8$, C=54.2%; H=7.23%. Found: C=54.0%; H=7.54%.

Example 2

This example illustrates the use of a low-purity formyl ester fraction containing valerolactone, ethyl crotonate and toluene but no formyl compounds other than ethyl 4-formylbutyrate. To apparatus of the type recited in Example 1 there were charged 1,000 grams of a broad range fraction containing 75.1% of ethyl 4-formylbutyrate, 350 grams of pentaerythritol, 1500 cc. of benzene, and 0.46 gram of sulfuric acid, and the mixture was heated for 2 hours at 80–85° C., the water of reaction being removed as formed by distillation. After completion of the reaction in two hours the reaction mixture was neutralized with sodium acetate, filtered, and the filtrate was vacuum stripped by distillation to a kettle temperature of 200° C. under 1 mm. of mercury pressure. There were thus secured 989 grams of the diester described in Example 1—a quantitative yield based on pentaerythritol, with a saponification equivalent of 387.5 (theory=388).

Example 3

Following the procedure described in Example 1, 474 grams of ethyl 3-formylpropionate containing 76.2% by weight of the said ester, 180 grams of pentaerythritol, 500 cc. of benzene and 0.22 gram of sulfuric acid were reacted at 80–85° C. and after completion of the reaction the reaction mixture was neutralized, filtered, and the filtrate vacuum stripped to a kettle temperature of 200° C at a pressure of 1 mm. mercury. There was thus secured as residue product 477 grams (a quantitative yield) of the diester 3,9 - bis(carbethoxyethyl)2,4,8,10 - tetraoxaspiro (5.5)hendecane having a saponification equivalent of 362.8 (theory=360). The product had the following analysis in percent by weight: Calculated for $C_{17}H_{28}O_8$ C=56.7; H=7.78. Found: C=56.7%; H=8.1%.

360 grams of the aforesaid diester was saponified a 25° C. in a solution consisting of 120 grams of sodium hydroxide dissolved in 1,000 cc. of water and 750 cc. of methanol. The saponification mixture was exactly neutralized with concentrated hydrochloric acid, and the resultant 3,9 - bis(carboxyethyl)2,4,8,10-tetraoxaspiro(5.5) hendecane was recovered by filtration of the reaction mixture, and was water-washed and dried. This product had a melting point of 207° C., a neutralization equivalent of 303.2 (theory=304) and the following analysis in percent by weight: Calculated for $C_{13}H_{20}O_8$, C=51.3%; H=6.58%. Found: C=51.3%; H=7.1%. A yield of 56.9% was secured.

Example 4

During two hours 270 grams of mixed ethyl formylhexahydrobenzoates (a mixture of the 4-formyl and 3-formyl isomers, purity=90%), 81.6 grams of pentaerythritol, 500 cc. of benzene and 0.09 gram of sulfuric acid were reacted at 80–85° C., the water of reaction being removed continuously by distillation as formed. The reaction mixture then was neutralized, filtered, and the filtrate vacuum stripped at a kettle temperature of 200° C. under 1 mm. mercury, yielding 268 grams (a 95.4% yield, based on pentaerythritol) 3,9-bis(carbethoxycyclohexyl)-2,4,8,10-tetraoxaspiro(5.5)-hendecane, having a saponification equivalent of 470.5 (theory=468); and the following analysis in percent by weight: Calculated for $C_{25}H_{40}O_8$, C=64.1%; H=8.61%. Found: C=63.9%; H=9.0%.

A diacid was prepared from the aforesaid diester as follows: 220 grams of the diester was heated at 100° C. in a 4% aqueous solution of sodium hydroxide, containing 1000 cc. of ethanol to dissolve the diester. After 60 hours the excess ethanol was distilled off, and the excess sodium hydroxide was exactly neutralized with hydrochloric acid. The product diacid thus liberated was recovered by filtration, and was washed with water and dried. Upon recrystallization from hot ethanol it yielded two fractions having the following properties: Fraction 1, melting point 214° C., neutralization equivalent 412 (theory=412). It had the following analysis in percent by weight: Calculated for $C_{21}H_{32}O_8$, C=61.2%; H=7.8%. Found: C=60.8%; H=7.5%. The yield of this fraction=13.4%, based upon the diester. The fraction 2 which corresponded to a yield of 54.7%, based upon the diester, had a melting point of 147° C., a neutralization equivalent of 412 and the following analysis: C=60.5%; H=7.5%. The fractions of different melting points resulted from a partial separation of the isomers.

Example 5

The preparation of a mixed diester is illustrated in this example. 75.2 grams of ethyl 4-formylbutyrate (purity=81.4%), 112 grams of 2-ethylbutyl 4-formylbutyrate (purity 76.2%), 55 grams of pentaerythritol, 500 cc. of benzene and 0.18 gram of sulfuric acid were reacted during 2.5 hours at 80–85° C., continuously distilling out water of reaction as formed. The reaction mixture then was neutralized with sodium acetate, filtered, and the filtrate vacuum stripped to a kettle temperature of 200° C. under a pressure of 1 mm. mercury yielding 186.8 grams (a 99.9% yield, based on pentaerythritol) of the mixed 3,9-(carbethoxypropyl)(carb-2-ethylbutoxypropyl) - 2,4,8,10 - tetraoxaspiro(5.5)hendecane. The product had a ratio of ethyl ester to ethylbutyl ester of 1.09:1.

Example 6

A mixture of 270 grams of ethyl formyl-2,5-endomethylenehexahydrobenzoate (a mixture of the 3-formyl and 4-formyl isomers, purity=96.3%), 86.7 grams of pentaerythritol, 500 cc. of benzene and 0.18 gram of concentrated sulfuric acid were reacted during two hours at the reflux temperature, removing water overhead as formed by distillation. The reaction mixture then was neutralized with sodium acetate, filtered, and the filtrate vacuum stripped to a kettle temperature of 200° C. under pressure of 1 mm. mercury, thereby yielding 263 grams (84% yield, based upon the pentaerythritol) of 3,9-bis(carbalkoxyendomethylenecyclohexyl) - 2,4,8,10 - tetraoxaspiro-(5.5)hendecane as a residue product having a saponification equivalent of 476 (theory=492). Chemical analysis in percent by weight: Calculated for $C_{27}H_{40}O_8$, C=65.9%; H=8.13%. Found: C=65.9%; H=8.3%.

Example 7

The preparation of a dinitrile is illustrated in this example. 81.7 grams of formylhexahydrobenzonitrile (a mixture of the 3-formyl and 4-formyl isomers, purity=94%), 34.7 grams of pentaerythritol, 200 cc. of benzine and 0.06 gram of concentrated sulfuric acid were refluxed for two hours, distilling out the by-product water as formed. The reaction mixture then was neutralized with sodium acetate, filtered, and the benzene and unreacted formylhexahydrobenzonitrile were removed by stripping the filtrate to a kettle temperature of 212° C. at 1 mm. mercury pressure. The residue product (secured in a 80% yield) was 3,9-bis-(cyanocyclohexyl)-2,4,8,10-tetraoxaspiro(5.5)hendecane melting at 70–72° C. It had the following analysis, in percent by weight: Calculated for $C_{21}H_{30}O_4N_2$, C=67.4%; H=8.2%; N=7.5%. Found: C=67.2%; H=8.7%; N=7.8%.

Example 8

This example illustrates the properties of a mixed nitrile ester. During two hours 30.4 grams of formylhexahydrobenzonitrile (mixed isomers), 41 grams of ethyl formylhexahydrobenzoate (mixed isomers), 28.3 grams of pentaerythritol, 200 cc. of benzene and 0.05 gram of concentrated sulfuric acid were held at reflux temperatures, the water of reaction being removed overhead as formed. The reaction mixture was then neutralized with sodium acetate, the neutralized mixture filtered, and the filtrate was stripped under vacuum to a final kettle temperature of 200° C. at 1 mm. mercury pressure. The residual nitrile ester which is believed to be a mixture of 3,9 - bis(carbethoxycyclohexyl) - 2,4,8,10 - tetraoxaspiro-(5.5)hendecane, 3,9-bis(cyanocyclohexyl) - 2,4,8,10 - tetraoxaspiro(5.5)hendecane, and mixed 3,9-(carbethoxycyclohexyl)(cyanocyclohexyl) - 2,4,8,10 - tetraoxaspiro(5.5)-hendecanes, had a saponification equivalent of 425 (theory=421). It had the following analysis, in percent by weight: Calculated for $C_{23}H_{35}O_6N$, C=65.6%; H=8.32%; N=3.3%. Found: C=65.3%, H=9.0%, N=4.7%. The yield was 95.4%, based upon the pentaerythritol.

Example 9

This example illustrates the preparation of a mixed nitrile ester having an excess of nitrile groups. During 2.5 hours a mixture of 28.1 grams of formylhexahydrobenzonitrile (a mixture of the 3-formyl and 4-formyl hexahydrobenzonitriles) 12.6 grams of ethyl formylhexahydrobenzoate (a mixture of 3-formyl and 4-formylhexahydrobenzoates), 18.7 grams of pentaerythritol, 175 cc. of benzene and 0.07 gram concentrated sulfuric acid were heated at reflux temperatures of 80–85° C. while distilling off the co-product water as formed. Thereafter the catalyst was neutralized with sodium acetate; and the neutralized mixture was filtered. The filtrate was stripped under vacuum to a kettle temperature of 200° C. at 1 mm. mercury pressure. The residual product, in 95% yield, was found, upon analysis by saponification, to contain 31.1% of the ester (theoretical ester content—29.4% based upon the charge ratio). The product which is believed to be a mixture of 3,9-bis(carbethoxycyclohexyl)-2,4,8,10-tetraoxaspiro(5.5)hendecane, 3,9-bis(cyanocyclohexyl)-2,4,8,10-tetraoxaspiro(5.5)hendecane, and mixed 3,9 - (carbethoxycyclohexyl)(cyanocyclohexyl) - 2,4,8,10-tetraoxaspiro(5.5)hendecanes, had the following analysis in percent by weight: Calculated for $C_{22}H_{33}O_5N_1$, C=66.4%; H=8.2%; N=5.3%. Found: C=67.1%; H=8.8%; N=6.1%.

Example 10

A mixture of 400 cc. of dioxane, 230 grams (0.70 mol) of methylformylstearate (approximately equal amounts of methyl 9-formyl-octadecanoate and methyl 10-formyl octadecanoate) 45.7 grams (0.336 mol) of pentaerythritol, and 0.075 gram of sulfuric acid was heated for 8 hours at a kettle temperature of 96–111° C. during which 207 grams of a dioxane-water distillate containing 0.668 mol of water was removed and recovered. Then 0.5 gram of sodium acetate was added to the mixture and after 30 minutes agitation, the mixture was filtered and the filtrate was stripped of dioxane at a kettle temperature of 250° C. under 1.5 mm. mercury pressure. The residual product was a mixture of 3,9-bis(8-carbmethoxy-(1-n-nonyl)octyl) - 2,4,8,10-tetraoxaspiro(5.5)hendecane and 3,9-bis(9-carbmethoxy(1-n-octyl)nonyl)-2,4,8,10-tetraoxaspiro(5.5)hendecane in a yield of 92% with a saponification equivalent of 384 (theory=377). It had the following analysis in percent by weight: Calc.: C=71.8; H=11.2. Found: C=71.6; H=10.9. The reaction product is a viscous, amber water-insoluble liquid, soluble in acetone, dioxane, benzene and ethanol, and slightly soluble in diethyl ether and in methanol.

Similarly, by the practice of the invention as herein disclosed, the reaction of pentaerythritol with ethyl 3-formylhexanoate yields 3,9-bis[2-carbethoxy(1-n-propyl)-ethyl]-2,4,8,10-tetraoxaspiro(5.5)hendecane; reaction with ethyl 2-ethyl-3-formylhexanoate yields 3,9-bis[2-carbethoxy(1 - n - propyl - 2 - ethyl)ethyl] - 2,4,8,10 - tetraoxaspiro(5.5)hendecane; reaction with butyl 3-formylbutyrate yields 3.9-bis[2-carbutoxy(1-methyl)ethyl]-2,4,8,10-tetraoxaspiro(5.5)hendecane; reaction with methyl 3-formylpentanoate yields 3,9-bis[2-carbmethoxy(1-ethyl)-ethyl] - 2,4,8,10 - tetraoxaspiro(5.5)hendecane; reaction with ethyl 2-butyl-5-formyloctanoate yields 3,9-bis[4-carbethoxy(1 - n - propyl - 4 - butyl)butyl] - 2,4,8,10-tetraoxaspiro(5.5)hendecane; the reaction with ethyl 2,2,4-trimethyl-4-formylpentanoate yields 3,9-bis[3-carbethoxy(1,1,3,3 - tetramethyl)propyl] - 2,4,8,10 - tetraoxaspiro(5.5)hendecane; reaction with methyl 6-ethyl-11-formyltetradecanoate yields 3,9-bis[10-carbmethoxy(1-n-propyl - 6 - ethyl)decyl] - 2,4,8,10 - tetraoxaspiro(5.5)-hendecane; and the reaction with methyl 14-formyldocosanoate yields 3,9-bis[13-carbmethoxy(1-n-octyl)tridecyl]-2,4,8,10-tetraoxaspiro(5.5)hendecane.

The corresponding diacids are made by saponifying the aforesaid esters in the manner hereinbefore described.

The diester products of the invention are useful as plasticizers for various vinyl resins, including polyvinyl chloride resins and copolymers of vinyl chloride with vinyl esters of the lower alkanoic acids such as vinyl acetate. Thus, the diester product of Example 1, after washing with normal sodium hydroxide and then with water until the washings were neutral and then heating at 100° C. under vacuum while sparging with nitrogen, was formulated with a commercially available resinous copolymer of vinyl chloride and vinyl acetate containing around 97% of the chloride in the polymer by mixing the indicated ingredients in the following proportions at ambient temperatures, followed by milling the mixture for 10-15 minutes at 170° C. on a two-roll differential mill:

| Formulation in parts by weight | A | B | C |
|---|---|---|---|
| VYNW resin | 100 | 100 | 100 |
| Spirobi m-dioxane diester | 40 | 50 | 70 |
| Dibasic lead phosphate | 2 | 2 | 2 |
| Dibasic lead stearate | 1 | 1 | 1 |

The resultant plasticized resins, upon examination showed the following properties:

| Formulation | A | B | C |
|---|---|---|---|
| Durometer Hardness | 96 | 86 | 71 |
| Brittle Temp., ° C | +14 | +4 | −8 |
| Volatility [1] | 1.57 | 2.70 | 4.53 |

[1] Volatility is determined by ASTM method D-1203-55.

The compounds of the invention wherein the 3 and 9 positions of the tetraoxaspirohendecane are substituted respectively by carb-higher alkoxyalkyl groups, such as the carboctyloxyethyl, carboctyloxypropyl, carbdecyloxyethyl and carbdecyloxypropyl radicals are believed to have greatly improved performance as plasticizers for vinyl chloride-containing resins, such as those herein mentioned.

The nitrile derivatives of this invention as well as the mixed nitrile ester derivatives thereof can be hydrogenated under mild conditions, i.e. in the presence of 3 to 5 weight percent of Raney nickel, in the presence of an inert diluent at temperatures of around 100 to 125° C. and hydrogen pressure of 50:150 pounds per square inch gauge to yield the corresponding diamines and amino-esters which are useful curing agents for epoxy resins.

The invention is susceptible of modification within the scope of the appended claim.

What is claimed is:

A mixture of 3,9-bis[8-carbmethoxy(1-n-nonyl)octyl]-2,4,8,10-tetraoxaspiro(5.5)hendecane and 3,9-bis[9-carbmethoxy (1-n-octyl)nonyl]-2,4,8,10-tetraoxaspiro(5.5)-hendecane produced by the reaction between pentaerythritol and an ester mixture of methyl 9-formyloctadecanoate and methyl 10-formyloctadecanoate in the ratio of at least 2 mols of said ester mixture per mol of pentaerythritol, in the presence of an acidic catalyst and an inert diluent at temperatures within the range from around 50° C. to around 150° C.

References Cited in the file of this patent

UNITED STATES PATENTS

| | | |
|---|---|---|
| 2,497,955 | Niederhauser et al. | Feb. 21, 1950 |
| 2,500,155 | Croxall et al. | Mar. 14, 1950 |
| 2,691,026 | Harvey | Oct. 5, 1954 |
| 2,864,852 | Jones | Dec. 16, 1958 |

OTHER REFERENCES

Boesken et al.: Berichte, vol. 61B, pp. 787–790 (1928).